(12) United States Patent
Otsuki et al.

(10) Patent No.: US 7,572,979 B2
(45) Date of Patent: Aug. 11, 2009

(54) WATERPROOF STRUCTURE AND WATERPROOF METHOD FOR WIRE CONNECTING PART

(75) Inventors: Hiroyuki Otsuki, Yokkaichi (JP); Yoshihiro Hisaki, Yokkaichi (JP); Takeharu Itou, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 268 days.

(21) Appl. No.: 11/547,613

(22) PCT Filed: Mar. 4, 2005

(86) PCT No.: PCT/JP2005/003746

§ 371 (c)(1), (2), (4) Date: Oct. 5, 2006

(87) PCT Pub. No.: WO2005/104302

PCT Pub. Date: Nov. 3, 2005

(65) Prior Publication Data

US 2007/0209821 A1 Sep. 13, 2007

(30) Foreign Application Priority Data

Apr. 26, 2004 (JP) ............................. 2004-130330

(51) Int. Cl.
*H01R 4/00* (2006.01)
(52) U.S. Cl. ................. 174/84 R; 174/88 R; 174/94 R; 174/95; 174/96
(58) Field of Classification Search ............... 174/74 R, 174/75 R, 76, 77, 78, 84 R, 84 S, 88 R, 92, 174/93, 94
See application file for complete search history.

(56) References Cited

U.S. PATENT DOCUMENTS

| | | | | |
|---|---|---|---|---|
| 3,879,575 A | * | 4/1975 | Dobbin et al. | ................. 174/92 |
| 4,647,717 A | * | 3/1987 | Uken | ......................... 174/84 C |
| 4,721,832 A | * | 1/1988 | Toy | ............................... 174/87 |
| 4,751,350 A | * | 6/1988 | Eaton | ............................ 174/87 |
| 4,849,580 A | * | 7/1989 | Reuter | ........................... 174/92 |
| 4,888,070 A | * | 12/1989 | Clark et al. | .................... 156/48 |
| 5,316,789 A | | 5/1994 | Ookuma et al. | |
| 5,399,810 A | * | 3/1995 | Hayami | ...................... 174/84 R |
| 6,303,865 B1 | * | 10/2001 | Yamamoto et al. | ......... 174/72 A |
| 6,730,847 B1 | * | 5/2004 | Fitzgerald et al. | .......... 174/77 R |
| 7,253,362 B1 | * | 8/2007 | Dower et al. | .............. 174/84 R |
| 7,304,244 B1 | * | 12/2007 | Dower et al. | ................... 174/92 |
| 7,307,219 B1 | * | 12/2007 | Dower et al. | .............. 174/84 R |
| 2002/0195267 A1 | * | 12/2002 | Suzuki | .................... 174/152 G |

FOREIGN PATENT DOCUMENTS

| | | | |
|---|---|---|---|
| JP | U 58-20475 | 2/1983 | |
| JP | A 1-206573 | 8/1989 | |
| JP | A 1-248484 | 10/1989 | |

(Continued)

*Primary Examiner*—William H Mayo, III
(74) *Attorney, Agent, or Firm*—Oliff & Berridge, PLC

(57) ABSTRACT

A waterproof structure and a waterproof method for a wire connecting part, wherein the insulating coatings of a plurality of wires are peeled, and exposed cores are connected to each other by welding, soldering, or through a crimp style terminal. A foam sheet impregnated with a silicone and an adhesive tape are wrapped around the connecting part, and the silicone is filled in clearances between the connected cores.

7 Claims, 9 Drawing Sheets

FOREIGN PATENT DOCUMENTS

| | | |
|---|---|---|
| JP | U 4-5062 | 1/1992 |
| JP | A 4-324263 | 11/1992 |
| JP | A 4-334917 | 11/1992 |
| JP | A 7-46744 | 2/1995 |
| JP | A 9-185967 | 7/1997 |
| JP | A 11-283446 | 10/1999 |
| JP | A 11-297382 | 10/1999 |

* cited by examiner

[Prior Art]

WATERPROOF STRUCTURE AND WATERPROOF METHOD FOR WIRE CONNECTING PART

TECHNICAL FIELD

The present invention relates to a waterproof structure of an electric wire connecting part and a waterproof method. More particularly the present invention is intended to waterproof the electric wire connecting part by filling silicone in the electric wire connecting part at which cores of electric wires exposed by peeling insulating covers thereof are connected to each other.

BACKGROUND ART

Heretofore, in connecting a plurality electric wires to each other in a wire harness to be mounted in a car, an insulating cover of each electric wire is peeled to expose each core thereof, and exposed portions of the cores are connected to each other by welding, soldering or with a pressure terminal to form a connecting part. When the connecting part is covered with water, the cores and the pressure terminal are corroded. Thus in the wire harness disposed at an engine room side which is a region into which water penetrates, a waterproof structure is formed at the connecting part thereof.

As a waterproof structure having the above-described construction, as disclosed in Japanese Patent Application Laid-Open No. 4-334917, the present applicant proposed a waterproof structure of the connecting part shown in FIG. 14. In the above-described waterproof structure, the insulating cover 1 of required electric wires w1, w2 constructing the wire harness is peeled to expose the cores 2, the exposed cores 2 are connected to each other with the pressure terminal 3 to form the connecting part 4, the connecting part 4 is embedded in the silicone 6 delivered to the waterproof film 5, and the waterproof film 5 and the auxiliary waterproof film 7 are wrapped around the connecting part 4.

When the cores 2 are connected to each other with the pressure terminal 3 as described above, the number of electric wires which can be connected is not large. Thus even though the silicone 6 has a high viscosity, waterproofness can be accomplished by filling the silicone 6 between the cores 2.

But in forming the connecting part by connecting a large number of the cores to each other by ultrasonic welding, resistance welding, soldering or the like, the silicone 6 cannot be filled in the entire spaces between the cores 2 when the silicone 6 has a high viscosity. Therefore to fill the silicone 6 in a large number of spaces between the cores 2, it is necessary to decrease the viscosity of the silicone 6. When the silicone 6 having a low viscosity is applied to and filled in the spaces between the cores 2, the above-described waterproof structure has a problem that the silicone 6 drops or oozes from the films 5, 7 in wrapping the films 5, 7 around the connecting part. No problem occurs if the oozed silicone 6 solidifies. But leaving the silicone 6 until it solidifies makes the work efficiency low.

Patent document 1: Japanese Patent Application Laid-Open No. 4-334917

DISCLOSURE OF THE INVENTION

Problem to the Solved by the Invention

The present invention has been made in view of the above-described problems. Thus it is an object of the present invention to efficiently form a waterproof structure which securely waterproofs an electric wire connecting part by filling silicone between cores of the electric wire connecting part and prevents the silicone from dropping during a work and oozing after the work finishes.

Means for Solving the Problem

To solve the above-described problems, the present invention provides a waterproof structure of an electric wire connecting part in which insulating covers of electric wires are peeled; and exposed cores are connected to each other by welding, soldering or with a pressure terminal to form a connecting part; a foamed sheet impregnated with silicone in a central portion thereof except a peripheral side thereof is wrapped around the connecting part; and the silicone which has oozed from the foamed sheet is filled in clearances between the connected cores to form a silicone-filled portion and excess silicone is absorbed by the foamed sheet to waterproof the electric wire connecting part without oozing the extra silicone outside.

In the above-described construction, the connecting part of the electric wires is waterproofed by wrapping the foamed sheet impregnated with the silicone around the connecting part of the electric wires and filling the silicone in clearances between the connected cores. In addition, the foamed sheet is capable of absorbing the silicone which has dropped or oozed from the foamed sheet in wrapping the foamed sheet around the electric wires. Therefore it is possible to efficiently perform a work of wrapping the foamed sheet around the electric wires by preventing drop or oozing of the silicone. Particularly in the present invention, because the silicone is not permeated into the peripheral side of the foamed sheet, the peripheral side of the foamed sheet efficiently re-absorbs the silicone which has dropped or oozed when the foamed sheet is wrapped around the connecting part, thus preventing the drop and oozing of the silicone.

Further because the foamed sheet prevents the drop or oozing of the silicone, it is possible to use the silicone having a low viscosity as a waterproof agent and thus fill the silicone in a large number of clearances between the cores by securely permeating the silicone thereinto.

Considering that the silicone permeates into the cores of the electric wires and is absorbed by the foamed sheet, it is preferable that the viscosity of the silicone is set to not more than 5 Pa·S.

It is preferable that an adhesive tape having an area larger than the foamed sheet is wrapped around a peripheral surface of the foamed sheet; the foamed sheet is overlapped on the adhesive tape at a central portion thereof in an axial direction of the connecting part of the cores, with the foamed sheet disposed at one-edge side with respect to a center in a direction in which the foamed sheet is wrapped around the connecting part of the cores; the adhesive tape and the foamed sheet overlapped on the adhesive tape are folded in such a manner as to surround the connecting part of the cores therewith; both ends of the foamed sheet are overlapped on each other; and the overlapped side is further folded, wound around a peripheral surface of the adhesive tape, and adhered to the adhesive surface thereof.

Thereby the foamed sheet is held, with the foamed sheet wrapped around the connecting part of the foamed sheet.

It is possible that a peripheral portion of the foamed sheet wrapped around the connecting part of the cores is closely fitted inside a pair of semicircular annular members coupled to each other through a thin hinge portion at one end of each of the semicircular annular members and that other ends of the semicircular annular members are locked to each other.

In the above-described construction, the connecting part of the electric wires can be easily waterproofed by wrapping the foamed sheet impregnated with the silicone around the connecting part of the electric wires, locking a pair of the semicircular annular members to each other, and mounting a sheath on the connecting part of the electric wires.

It is preferable that the foamed sheet consists of an interconnecting cellular foamed material.

In this construction, the silicone which has sufficiently permeated into the foamed sheet oozes to form the silicone-filled portion. In addition, it is possible to efficiently absorb the silicone that has oozed outside.

It is preferable that a triangular concavity is formed at one side of the foamed sheet and a triangular convexity is formed at an opposed other side thereof; the concavity and the convexity are adhered to the adhesive tape having a large area, with the concavity and the convexity opposed to each other in an electric wires-wrapping direction; the connecting part of the cores is disposed at a center of the foamed sheet, and the foamed sheet and the adhesive tape are wrapped around the connecting part of the cores.

Owing to the above-described configuration of the foamed sheet, when the adhesive tape and the foamed sheet are folded at the position where the electric wires are disposed, with the foamed sheet impregnated with the silicone disposed on the adhesive tape and with the connecting part of the cores disposed on the foamed sheet, the surface of the concavity and that of the convexity fitted in the concavity adhere to the adhesive tape. Thus when the concavity and the convexity are further folded and wrapped around the connecting part of the cores, the foamed sheet does not shift because the surface of the concavity and that of the convexity adhere to the adhesive tape. Therefore it is easy to accomplish a wrapping work which is performed by re-folding the concavity and the convexity.

The foamed sheet is not overlapped at the position where the foamed sheet is re-folded. Because only one sheet of the foamed sheet is folded, a large force is unnecessary in folding it.

It is possible that the foamed sheet which is rectangular is disposed, wound, and portions thereof are laminated on each other, with the foamed sheet inclined with respect to an axial direction of the connecting part of the cores and that the rectangular adhesive tape disposed in parallel with the axial direction of the connecting part of the cores is wrapped around a peripheral surface of the foamed sheet.

In the above-described construction, when the adhesive tape and the foamed sheet are folded at the position where the electric wires are disposed, portions of the foamed sheet overlap on each other, and portions of the adhesive tape are adhered to each other at both sides of the foamed sheet. Thus when the overlapped side is further folded and wound, the foamed sheet does not shift. Therefore it is easy to accomplish a wrapping work which is performed by re-folding the overlapped side.

The foamed sheet is disposed by inclining it with respect to the axial direction of the connecting part, at the position where the foamed sheet is folded and overlapped, the foamed sheet is short in the axial length of the connecting part. Therefore a large force is not required to fold the foamed sheet.

The present invention provides a method of waterproofing an electric wire connecting part, including the steps of:

forming a connecting part of cores by peeling insulating covers of a plurality of electric wires and connecting exposed cores to each other by welding, soldering or with a pressure terminal;

overlapping a foamed sheet having a smaller area than an adhesive tape on the adhesive tape at a central portion thereof in an axial direction of the connecting part of the cores, with the foamed sheet disposed at one-edge side with respect to a center in a direction in which the foamed sheet is wrapped around the connecting part of the cores, and impregnating the foamed sheet with silicone;

folding the adhesive tape and the foamed sheet overlapped on the adhesive tape in such a manner as to surround the connecting part of the cores therewith, overlapping both ends of the foamed sheet on each other, further folding the overlapped side, winding the overlapped side around a peripheral surface of the adhesive tape, and adhering the overlapped side to the peripheral surface of the adhesive tape; and oozing the silicone from the foamed sheet to the connecting part of the cores to fill the silicone into clearances between the cores and re-absorbing excess silicone by the foamed sheet to prevent the excess silicone from flowing outside.

Particularly, a concavity and a convexity fitting in each other are formed at opposite sides of a surface of the foamed sheet in a direction in which the foamed sheet is wrapped around the connecting part of the cores or the foamed sheet which is rectangular is disposed, with the foamed sheet inclined with respect to the axial direction of the connecting part of the cores. Thereby as described above, the foamed sheet and the adhesive sheet can be re-folded easily at the position where the foamed sheet and the adhesive sheet are folded and overlapped on each other.

Further the present invention provides a method of waterproofing an electric wire connecting part, including the steps of:

forming a connecting part of cores by peeling insulating covers of a plurality of electric wires and connecting exposed cores to each other by welding, soldering or with a pressure terminal; and disposing a sheath comprising a pair of semicircular annular members whose ends are coupled to each other with a thin hinge portion and whose other ends are locked to each other on a temporary positioning concavity of a jig, for temporarily positioning the sheath for sheathing the connecting part of the cores, having a locking concavity for locking the sheath in a center of the temporary positioning concavity, with the sheath open; disposing the foamed sheet impregnated with silicone on the sheath; disposing the connecting part of the cores on the foamed sheet; pressing the connecting part of the cores into the locking concavity of the jig to lock a pair of the semicircular annular members to each other; and covering the connecting part of the cores with the foamed sheet; and closely fit the connecting part of the cores inside the sheath.

EFFECT OF THE INVENTION

As described above, according to the present invention, waterproofing is performed by wrapping the foamed sheet impregnated with the silicone around the connecting part of the electric wires and filling the silicone in the clearances between the cores. In addition, the foamed sheet is capable of absorbing the silicone which has dropped or oozed therefrom. Therefore it is unnecessary to leave the silicone until it solidifies and possible to efficiently perform a work of wrapping the foamed sheet around the electric wires.

Further because the foamed sheet prevents the drop or oozing of the silicone, it is possible to use the silicone having a low viscosity as a waterproof agent and thus fill the silicone in a large number of clearances between the cores by securely allowing the silicone to permeate thereinto.

EXPLANATION OF REFERENCE SYMBOLS AND NUMERALS

Figure 1A:
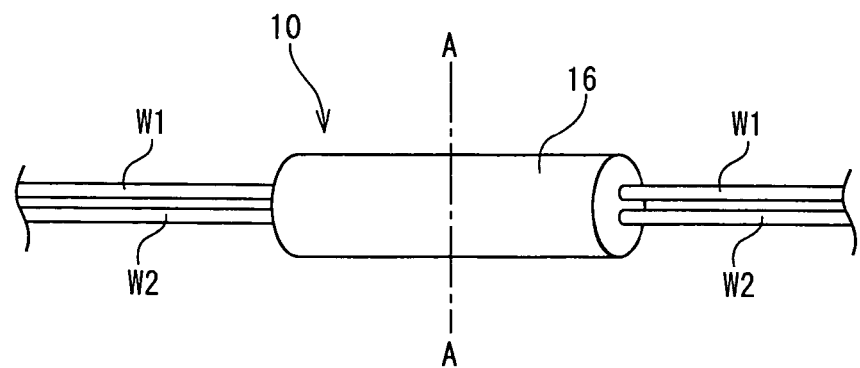
FIG. 1 shows a first embodiment of the present invention, in which (A) is a perspective view, and (B) is a sectional view taken along a line A-A.
Figure 1B:
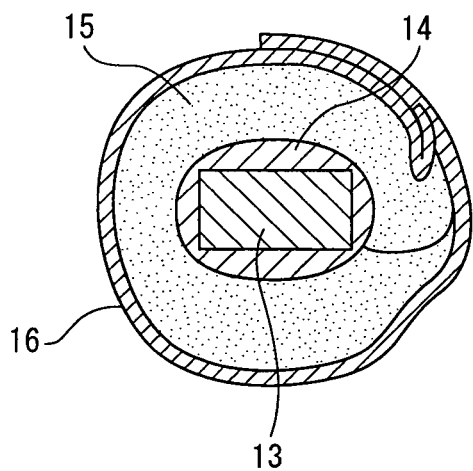

10: waterproof structure
11: insulating cover
12: core
13: connecting part
14: silicone
15: foamed sheet
15$a$: concavity
15$b$: convexity
16: adhesive tape
20: sheath
20$a$: semicircular annular member
30: jig

BEST MODE FOR CARRYING OUT THE INVENTION

The embodiments of the present invention will be described below with reference to the drawings.

FIGS. 1 through 5 show a first embodiment of the present invention. Cores 12 exposed by peeling insulating covers 11 of electric wires w1, w2 at a central position of each of the electric wires w1, w2 are welded by ultrasonic wave to form a connecting part 13. The connecting part 13, the exposed cores 12 disposed at both sides of the connecting part 13, and a tip portion of each of the insulating covers 11 continuous with the cores 12 respectively are embedded in silicone 14. A foamed sheet 15 and an adhesive tape 16 are wrapped around the silicone 14 to surround the silicone 14 completely to form a waterproof structure 10.

Figure 3:
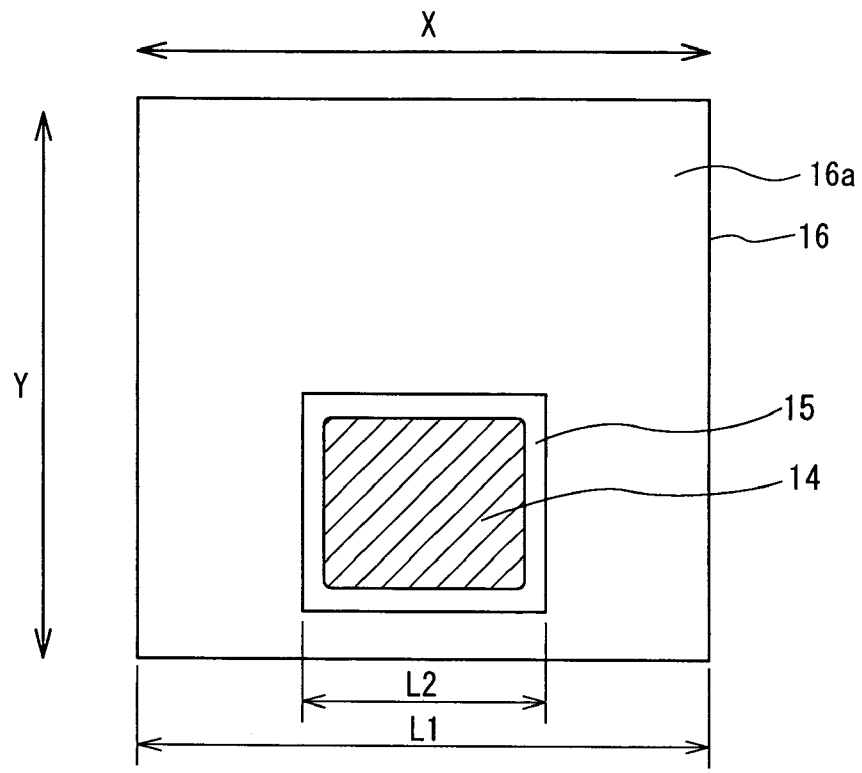
FIG. 3 shows a state in which a foamed sheet is placed on an adhesive tape.
Figure 4:
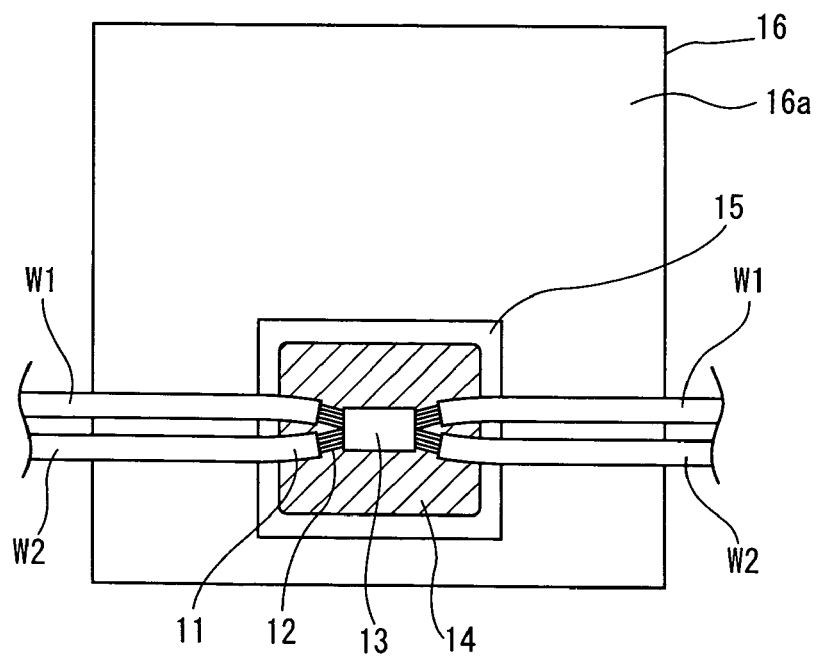
FIG. 4 shows a state in which a connecting part of the electric wires is placed on the foamed sheet.

As shown in FIG. 3, the foamed sheet 15 and the adhesive tape 16 are both rectangular before they are wrapped around the electric wires w1, w2. A length L1 of the adhesive tape 16 in an axial direction X of the connecting part 13 is set to 65 mm. A length L2 of the foamed sheet 15 in the axial direction X of the connecting part 13 is set to not more than 80% of the length L1 and set to 46% of the length L1, namely, 30 mm in the first embodiment. The foamed sheet 15 is adhered to the adhesive tape 16 at a central position thereof in the axial direction X of the connecting part 13, with the foamed sheet 15 parallel with the adhesive tape 16. An adhesive surface 16$a$ of the adhesive tape 16 is exposed at both sides of the foamed sheet 15 to allow the adhesive surface 16$a$ to be adhesive to the electric wires w1, w2 to be placed thereon. The length of the foamed sheet 15 in an electric wire-wrapping direction Y is set longer than the length of the periphery of the electric wires around which the foamed sheet 15 is wrapped to allow the periphery of the electric wires w1, w2 to be wrapped with at least one turn of the foamed sheet 15.

The foamed sheet 15 is composed of an interconnecting cellular foamed material. The silicone 14 is applied to the center of the foamed sheet 15 to impregnate the foamed sheet 15 with the silicone 14. On the other hand, the silicone 14 is not applied to the peripheral side of the foamed sheet 15.

The viscosity of the silicone 14 is set to a low viscosity of 5 Pa·S. The application amount of the silicone 14 is shown by $(1-n) \times (a \times h) \times s (g)$ (n is the density (g/cm$^3$) of the foamed sheet, a is the surface area (cm$^2$) of the foamed sheet, h is the thickness (cm) of the foamed sheet, and s is the specific gravity of the silicone). In the first embodiment, n=0.064 (g/cm$^3$), a=9 (cm$^2$), h=0.2 (cm), and s=1.01 (g). The application amount of the silicone 14 is set to 1.7 g.

The method of forming the waterproof structure 10 of the connecting part 13 is described below.

Figure 2:
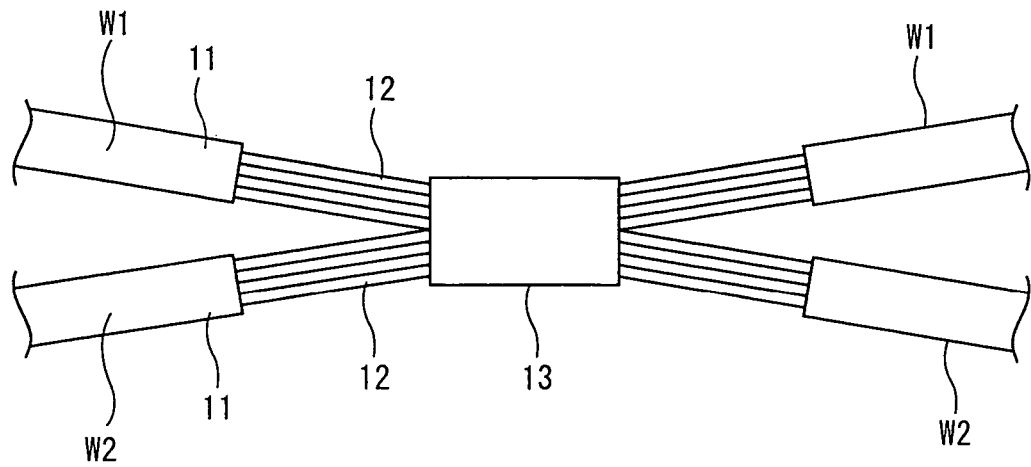
FIG. 2 shows a connecting part of electric wires.

Initially as shown in FIG. 2, the cores 12 are exposed by peeling the insulating covers 11 at the required central position of the electric wires w1, w2 at which they are connected to each other. The exposed cores 12 are welded to each other by a ultrasonic wave to form the connecting part 13 where the electric wires w1, w2 are connected to each other.

As shown in FIG. 3, after the foamed sheet 15 is stuck to the adhesive surface 16$a$ of the adhesive tape 16, the silicone 14 is applied to the foamed sheet 15 and permeated thereinto.

The connecting part 13 of the electric wires w1, w2 is placed at the central position of the foamed sheet 15.

Figure 5A:
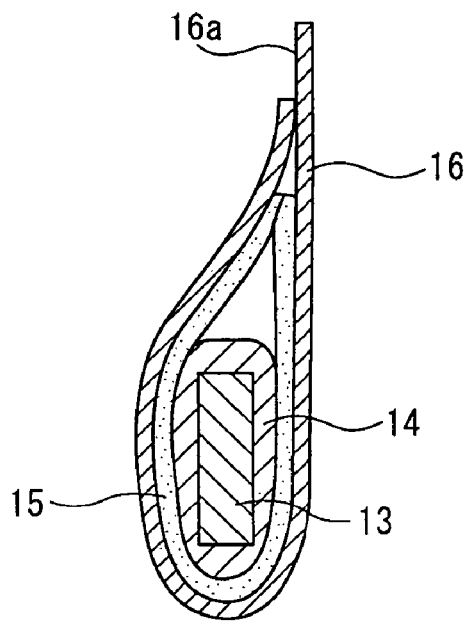
FIGS. 5A and 5B show a method of forming a waterproof structure of the first embodiment.

Thereafter as shown in FIG. 5(A), the foamed sheet 15 and the adhesive tape 16 are folded at the position of the foamed sheet 15 where the electric wires w1, w2 are disposed, both ends of the foamed sheet 15 are overlapped on each other, and the opposed adhesive surfaces 16$a$ of the adhesive tape 16 are adhered to each other. At this time, the silicone 14 which has permeated into the foamed sheet 15 oozes to form a silicone-filled portion, with the silicone 14 penetrating between the cores 12 of the electric wires w1, w2. When the silicone 14 which has oozed from the foamed sheet 15 flows toward both sides of the connecting part 13 in its axial direction, the peripheral portion of the foamed sheet 15 re-absorbs the silicone 14, thus preventing the silicone 14 from oozing from the foamed sheet 15.

Figure 5B:
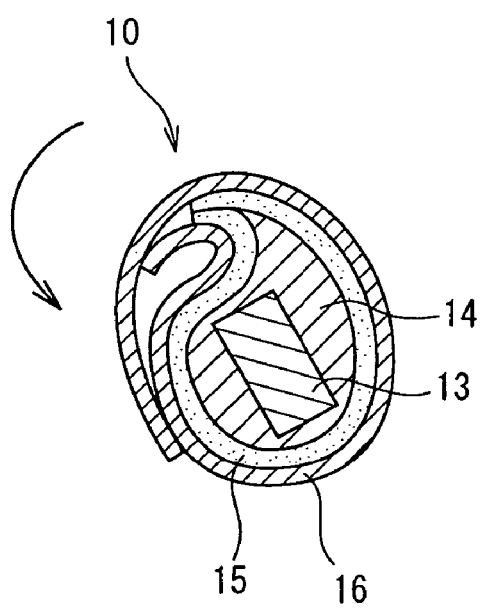

Finally as shown in FIG. 5B, the foamed sheet 15 is further folded by a tape-wrapping machine (not shown) at the position thereof where both ends have been overlapped on each other. Thereafter the adhesive surface 16$a$ of the adhesive tape 16 is wrapped around the peripheral surface of the adhesive tape 16 and adhered thereto.

In the above-described construction, because the silicone 14 having a low viscosity is used to waterproof the connecting part 13 formed between the electric wires w1 and w2, the silicone 14 can be penetrated between the cores 12 of the electric wires w1, w2. Thus the waterproofness can be secured. Further the silicone 14 having a low viscosity is permeated into the foamed sheet 15. Thus when the foamed sheet 15 is wrapped around the electric wires w1, w2, the silicone 14 oozes from the foamed sheet 15 and can be permeated between the cores 12. The silicone 14 oozing from the foamed sheet 15 can be re-absorbed by the foamed sheet 15. Therefore it is possible to efficiently perform a work of wrapping the foamed sheet 15 around the electric wires w1, w2.

Because the foamed sheet 15 is capable of absorbing the silicone oozing from the foamed sheet 15, it is only necessary to wrap the foamed sheet 15 to the tip portion of the insulating cover 11 continuous with the exposed cores 12. Thus it is possible to decrease the wrapping range of the foamed sheet 15. Thereby the electric wires are not made large.

Although in the first embodiment, two electric wires are spliced to each other, the waterproof structure of the first embodiment may be formed for a connection part at which not less than three electric wires are spliced to each other.

Further the waterproof structure of the first embodiment may be formed for not only the connecting part formed at the central position of the electric wires, but also for the connecting part formed at the terminal of electric wires.

The connecting part of the cores may be formed by connecting the cores to each other not only by welding but also by soldering or with a pressure terminal.

Figure 6:
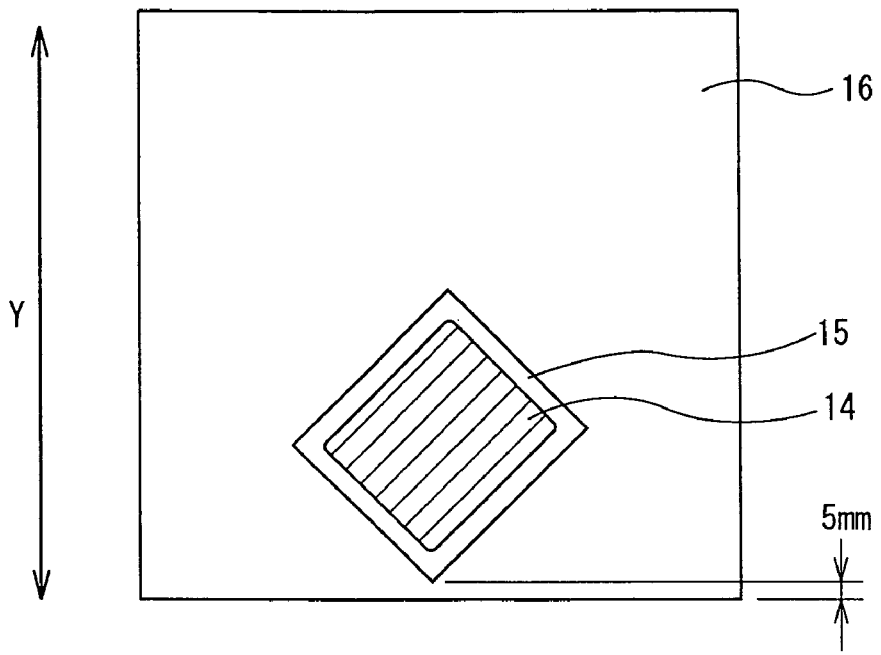
FIG. 6 shows a second embodiment of the present invention, showing a state in which a foamed sheet is adhered to an adhesive tape.
Figure 7:
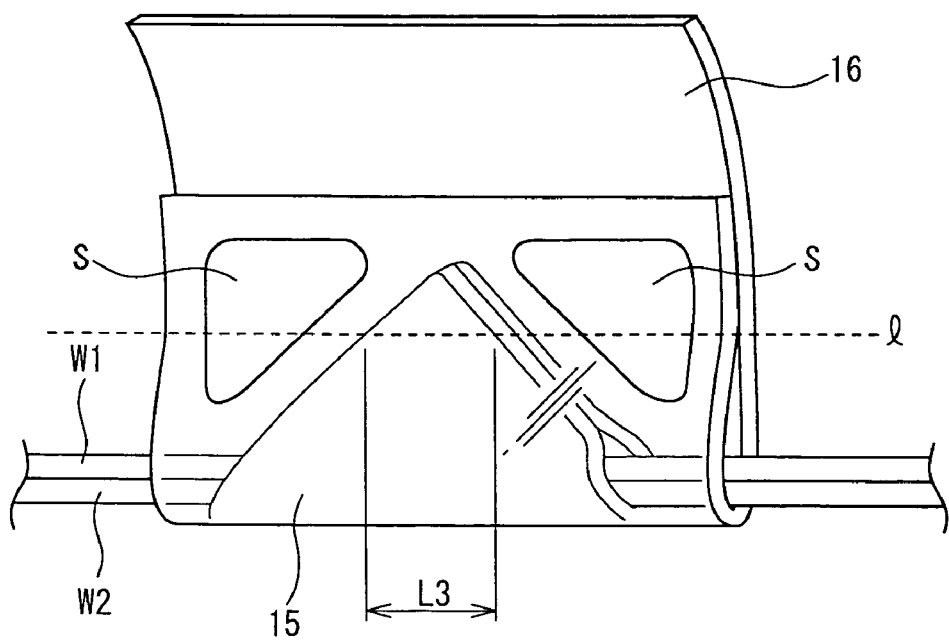
FIG. 7 shows the process of forming a waterproof structure of the second embodiment.

FIGS. 6 and 7 show the second embodiment of the present invention. The foamed sheet 15 similar to that of the first embodiment is stuck to the adhesive tape 16 by rotating the foamed sheet 15 45 degrees. The foamed sheet 15 is disposed at an inclination of 45 degrees to the axial direction of the connecting part 13, whereas the adhesive tape 16 is disposed in parallel with the axial direction of the connecting part 13. The distance between a corner of the foamed sheet 15 closest to the periphery of the adhesive tape 16 and the periphery of the adhesive tape 16 is set to 5 mm.

The electric wires w1, w2 having the connecting part 13 are placed on diagonal lines of the foamed sheet 15. Similarly to the first embodiment, as shown in FIG. 7, the foamed sheet 15 and the adhesive tape 16 are folded at the position where the electric wires w1, w2 are disposed, the foamed sheet 15 is overlapped, and the adhesive surfaces 16a of the adhesive tape 16 are laminated on each other. Finally by using a tape-wrapping machine, the foamed sheet 15 and the adhesive tape 16 are further folded at a broken line 1 drawn at the overlapped portion of the foamed sheet 15 to wrap the adhesive surface 16a of the adhesive tape 16 around the peripheral surface of the adhesive tape 16.

In the above-described construction, because an axial length L3 of the connecting part on the broken line 1 along which the foamed sheet 15 is folded by using the tape-wrapping machine is short, the foamed sheet 15 can be folded at a smaller torque than the torque in the first embodiment. Because an adhesive force is increased by increasing an area of contact S between the adhesive tape 16 at both sides of the folded foamed sheet 15, the foamed sheet 15 does not shift in the axial direction of the connecting part. Thus the foamed sheet 15 can be easily wrapped around the electric wires w1, w2.

Figure 8:
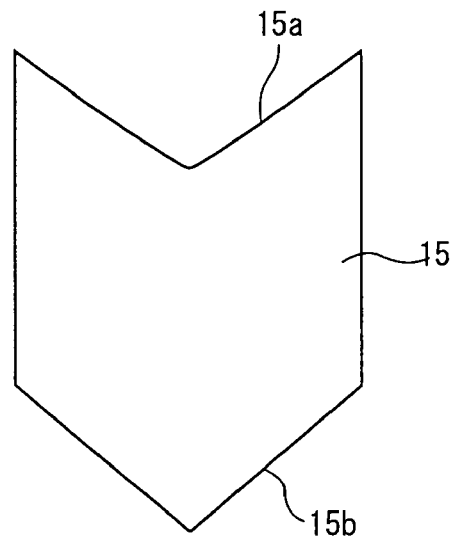
FIG. 8 is a plan view of a foamed sheet of a first modification of the second embodiment.
Figure 9:
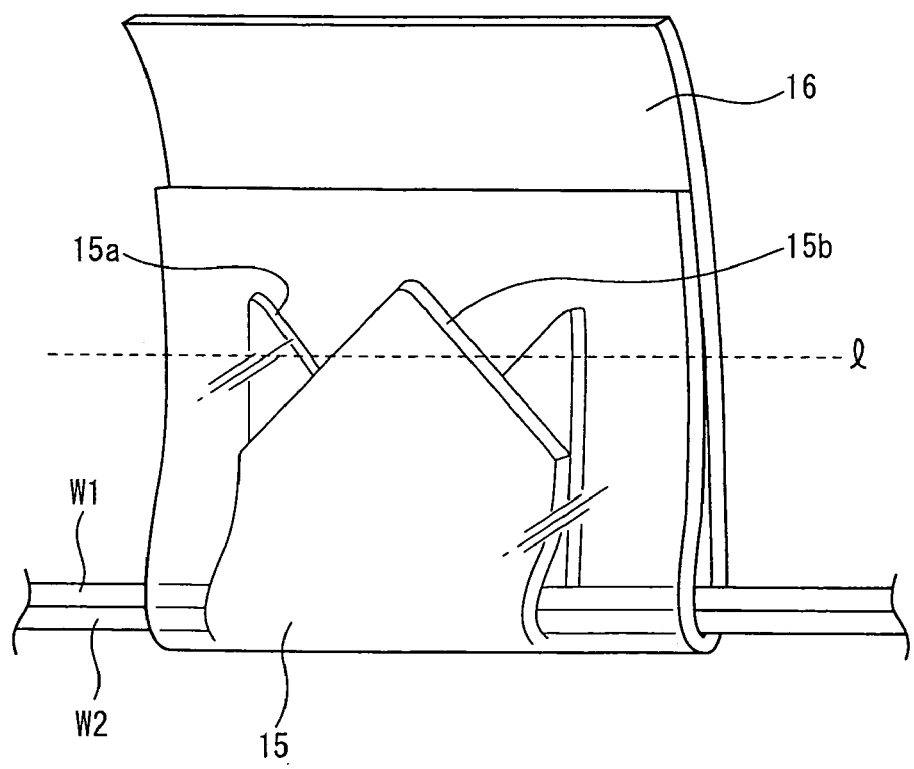
FIG. 9 shows the process of forming a waterproof structure of the first modification of the second embodiment.

FIGS. 8 and 9 show a first modification of the second embodiment in which the configuration of the foamed sheet 15 is different from that of the foamed sheet 15 of the second embodiment. A triangular concavity 15a is formed at one side of the foamed sheet 15, and a triangular convexity 15b is formed at the opposed other side thereof.

The concavity 15a of the foamed sheet 15 and the convexity 15b thereof are adhered to the adhesive tape 16, with the concavity 15a and the convexity 15b opposed to each other in an electric wires-wrapping direction. The foamed sheet 15 and the adhesive tape 16 are folded at a position where the electric wires w1, w2 are disposed, with the electric wires w1, w2 placed at positions where the electric wires w1, w2 pass through the center of the foamed sheet 15. As a result, a state shown in FIG. 9 is obtained. Because the foamed sheet 15 is not overlapped on the broken line 1 at which the foamed sheet 15 is folded by the tape-wrapping machine, the foamed sheet 15 can be folded at a small torque. Both surfaces of the foamed sheet 15 are adhered to the adhesive tape 16 on the broken line 1, the foamed sheet 15 does not shift in the axial direction of the connecting part. Thus the foamed sheet 15 can be easily wrapped around the electric wires w1, w2.

Figure 10:
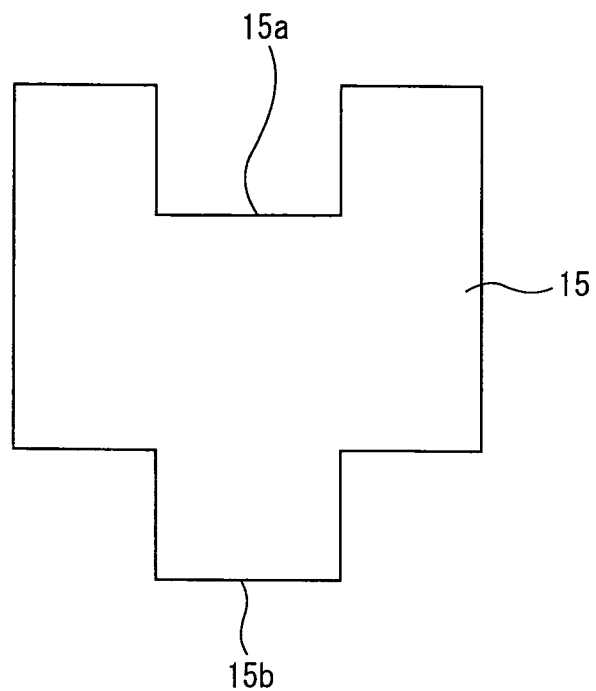
FIG. 10 is a plan view of a foamed sheet of a second modification of the second embodiment.
Figure 11:
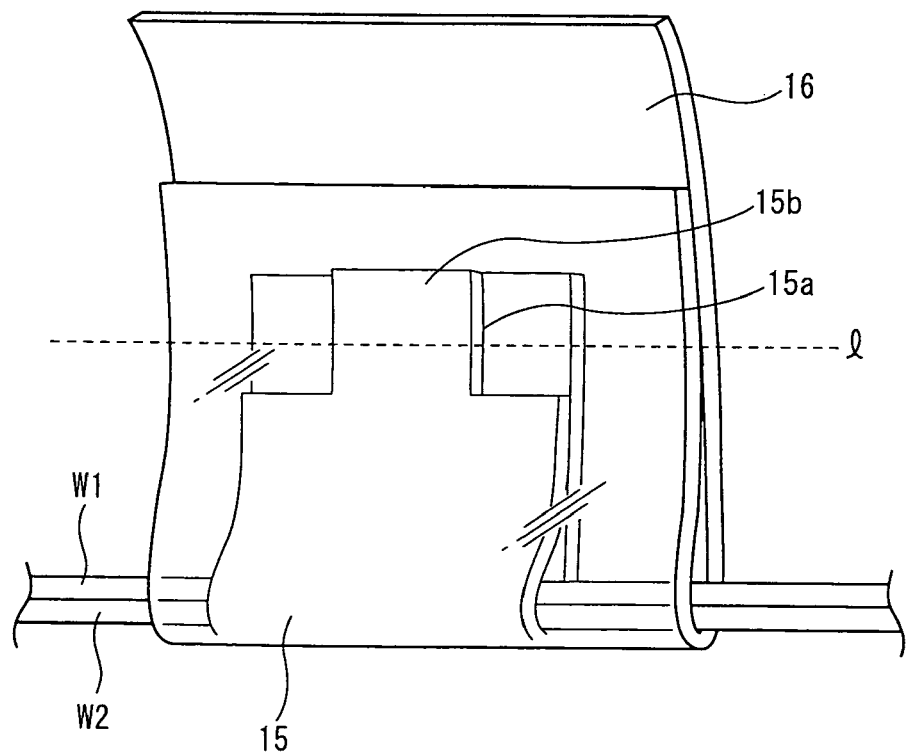
FIG. 11 shows the process of forming a waterproof structure of a second modification of the second embodiment.

FIGS. 10 and 11 show a second modification of the second embodiment in which a quadrangular concavity 15a is formed at one side of the foamed sheet 15, and a quadrangular convexity 15b is formed at the opposed other side thereof. When the foamed sheet 15 and the adhesive tape 16 are folded at a position where the electric wires w1, w2 are disposed, a state shown in FIG. 11 is obtained. The foamed sheet 15 is not overlapped on the broken line 1 at which the foamed sheet 15 is folded by the tape-wrapping machine. Therefore in the second modification, it is possible to obtain an effect similar to that of the first modification.

Figure 12:
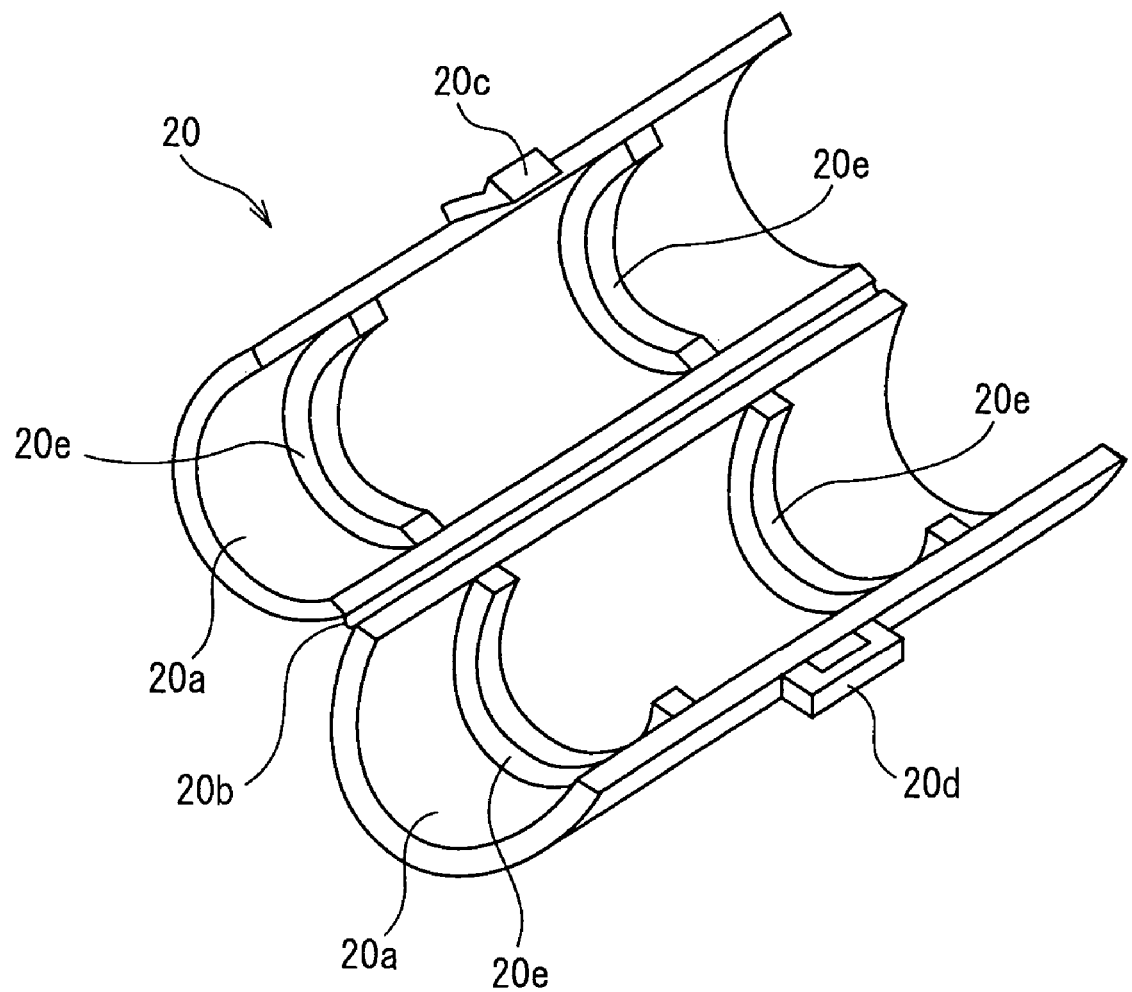
FIG. 12 is a perspective view of a sheath for use in a third embodiment of the present invention.

FIGS. 12 and 13 show a third embodiment of the present invention. In the third embodiment, the adhesive tape is not used, but a sheath 20, made of resin, in which ends of a pair of semicircular annular members 20a are coupled to each other with a thin hinge portion 20b is used. At the other end of the two semicircular annular members 20a, a locking portion 20c and a to-be-locked portion 20d are formed at corresponding positions. A rib 20e for preventing slip of the foamed sheet 15 is formed on an inner peripheral surface of each semicircular annular member 20a at positions in the vicinity of both ends of each semicircular annular members 20a in its longitudinal direction. Similarly to the first embodiment, a waterproof structure 10' is formed by accommodating electric wires inside the sheath 20, with the foamed sheet 15 into which the silicone 14 has been permeated wrapped around the electric wires, locking a pair of the semicircular annular members 20a to each other, and mounting the sheath 20 on the electric wires.

In forming the waterproof structure 10', a jig 30 is used. As shown in FIG. 13, the jig 30 is provided with two temporary positioning concavities 30a for temporarily positioning the sheath 20 on the outer surface of the jig 30 and a locking concavity 30b for locking a pair of the semicircular annular members 20a to each other by pressing the sheath 20 into the locking concavity 30b. The locking concavity 30b is disposed between the temporary positioning concavities 30a and below the temporary positioning concavities 30a.

The method of forming the waterproof structure 10' is described below.

Figure 13A:
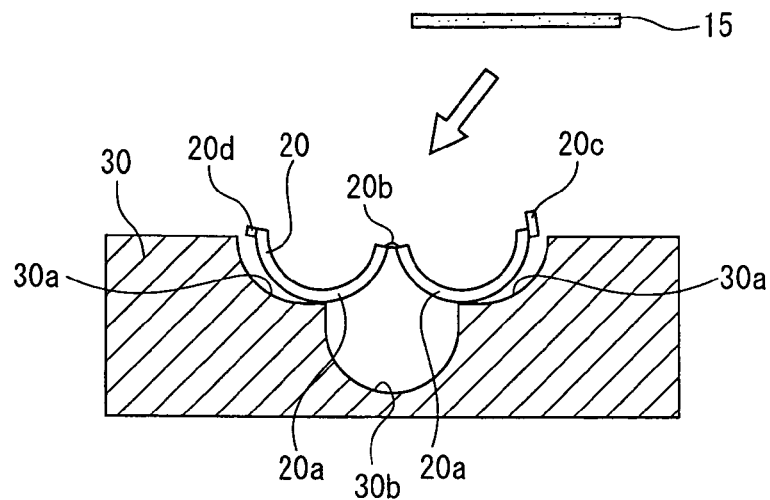
FIGS. 13(A), (B), and (C) show a method of forming a waterproof structure of the third embodiment.

Initially as shown in FIG. 13(A), the sheath 20 is placed in the temporary positioning concavity 30a of the jig 30, with a pair of the semicircular annular members 20a open.

Figure 13B:
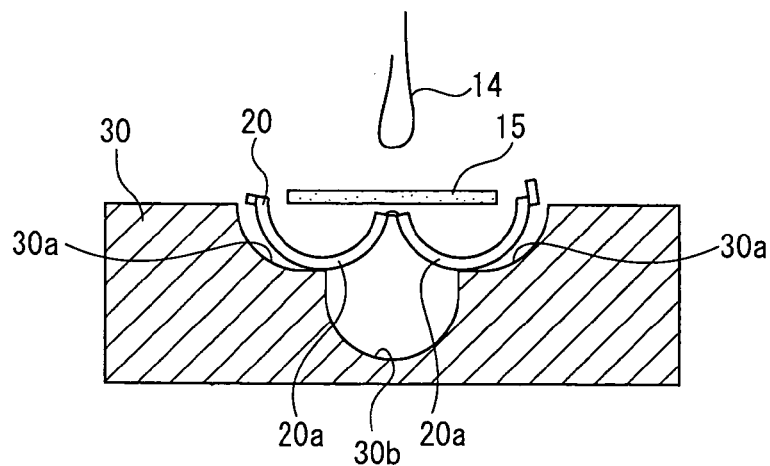

Thereafter as shown in FIG. 13(B), the foamed sheet 15 is placed on an upper surface of the sheath 20, and the silicone 14 is delivered to the foamed sheet 15 and permeated thereinto.

Figure 13C:
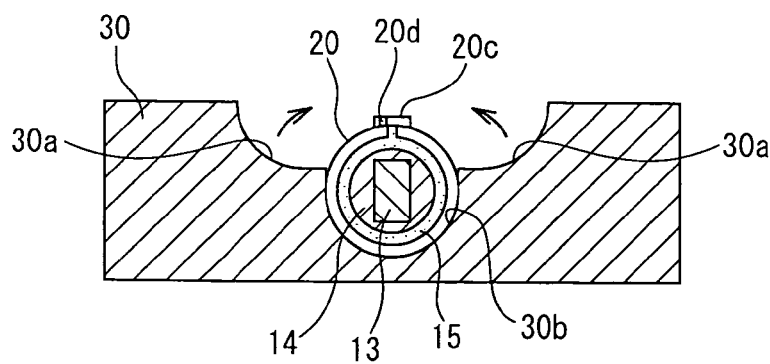
Figure 14A:
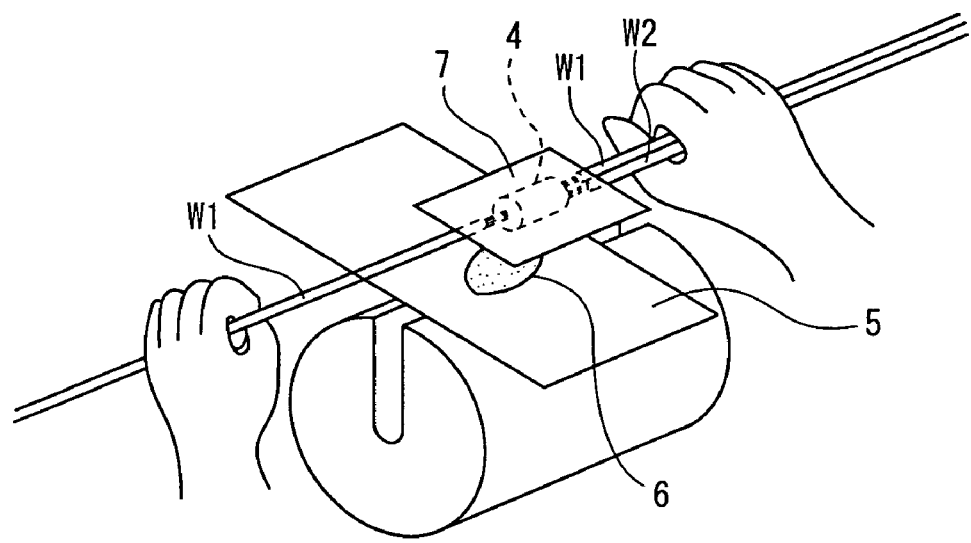
FIGS. 14(A) and (B) show a conventional art.
Figure 14B:
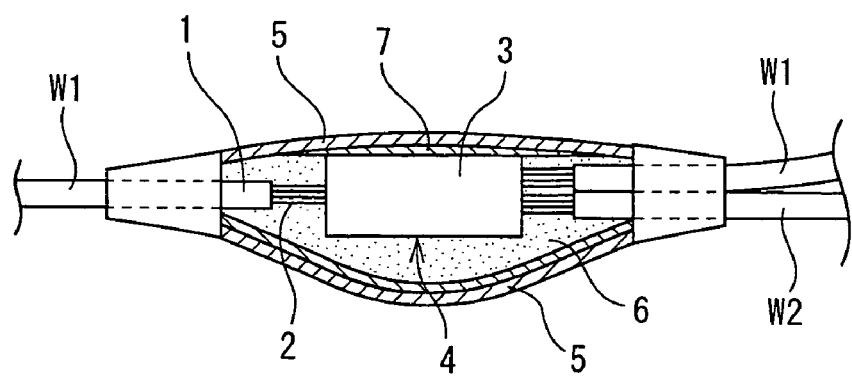

Finally as shown in FIG. 13(C), with the axial direction of the connecting part 13 of the cores 12 in conformity to the longitudinal direction of the semicircular annular member 20a, the connecting part 13 is placed on the foamed sheet 15. When the connecting part 13 is pressed downward, the sheath 20 is pressed into the locking concavity 30b, and the two semicircular annular members 20a are bent in a direction in which the semicircular annular members 20a approach to each other on the thin hinge portion 20b and are locked to each other.

By carrying out the above-described method, the waterproof structure 10' can be formed on the connecting part 13.

In the above-described method, the electric wires are merely pressed into the jig. Therefore without skill, everybody can easily form the waterproof structure 10'. Further the method eliminates the need for using the tape-wrapping machine. Thus it is possible to reduce the cost of forming the waterproof structure 10'.

Further by visually checking whether a pair of the semicircular annular members 20a has been locked to each other, it is possible to detect whether the waterproof structure has been formed. Furthermore by forming the sheath 20 from a transparent resin, it is possible to visually check a state inside the sheath 20.

The invention claimed is:

1. A waterproof structure of an electric wire connecting part in which insulating covers of electric wires are peeled; and exposed cores are connected to each other by welding, soldering or with a pressure terminal to form a connecting part;

a foamed sheet impregnated with a low viscosity silicone in a central portion thereof except a peripheral side thereof is wrapped around said connecting part; and said silicone which has oozed from said foamed sheet is filled in clearances between said connected cores to form a silicone-filled portion and excess silicone is absorbed by said foamed sheet to waterproof said electric wire connecting part without oozing said extra silicone outside, wherein:

an adhesive tape having an area larger than said foamed sheet is wrapped around a peripheral surface of said foamed sheet, said foamed sheet is overlapped on said adhesive tape at a central portion thereof in an axial direction of said connecting part of said cores, with said foamed sheet disposed at one-edge side with respect to a center in a direction in which said foamed sheet is wrapped around said connecting part of said cores, said adhesive tape and said foamed sheet overlapped on said adhesive tape are folded in such a manner as to surround said connecting part of said cores therewith, both ends of said foamed sheet are overlapped on each other, and an overlapped side is further folded, wound around a peripheral surface of said adhesive tape, and adhered to said adhesive surface thereof.

2. The waterproof structure of an electric wire connecting part according to claim 1, wherein said foamed sheet consists of an interconnecting cellular foamed material.

3. The waterproof structure of an electric wire connecting part according to claim 1, wherein a triangular concavity is formed at one side of said foamed sheet and a triangular convexity is formed at an opposed other side thereof;

said concavity and said convexity are adhered to said adhesive tape having a large area, with said concavity and said convexity opposed to each other in an electric wires-wrapping direction;

said connecting part of said cores is disposed at a center of said foamed sheet, and said foamed sheet and said adhesive tape are wrapped around said connecting part of said cores.

4. The waterproof structure of an electric wire connecting part according to claim 1, wherein said foamed sheet which is rectangular is disposed, wound, and portions thereof are laminated on each other, with said foamed sheet inclined with respect to an axial direction of said connecting part of said cores; and said rectangular adhesive tape disposed in parallel with said axial direction of said connecting part of said cores is wrapped around a peripheral surface of said foamed sheet.

5. A method of waterproofing an electric wire connecting part, comprising the steps of:

forming a connecting part of cores by peeling insulating covers of a plurality of electric wires and connecting exposed cores to each other by welding, soldering or with a pressure terminal;

overlapping a foamed sheet having a smaller area than an adhesive tape on said adhesive tape at a central portion thereof in an axial direction of said connecting part of said cores, with said foamed sheet disposed at one-edge side with respect to a center in a direction in which said foamed sheet is wrapped around said connecting part of said cores, and impregnating said foamed sheet with silicone having a low viscosity;

folding said adhesive tape and said foamed sheet overlapped on said adhesive tape in such a manner as to surround said connecting part of said cores therewith, overlapping both ends of said foamed sheet on each other, further folding an overlapped side, winding said overlapped side around a peripheral surface of said adhesive tape, and adhering said overlapped side to said peripheral surface of said adhesive tape; and oozing said silicone from said foamed sheet to said connecting part of said cores to fill said silicone into clearances between said cores and re-absorbing excess silicone by said foamed sheet to prevent said excess silicone from flowing outside.

6. The method of waterproofing an electric wire connecting part according to claim 5, wherein a triangular concavity is formed at one side of said foamed sheet and a triangular convexity is formed at an opposed other side thereof;

said concavity and said convexity are adhered to said adhesive tape having a large area, with said concavity and said convexity opposed to each other in an electric wire-wrapping direction;

said connecting part of said cores is disposed at a center of said foamed sheet;

said foamed sheet and said adhesive tape are folded in such a manner as to surround said connecting part of said cores therewith;

both surfaces of said concavity and both surfaces of said convexity fitted in said concavity are adhered to said adhesive tape; and said concavity and said convexity are further folded and wound.

7. The method of waterproofing an electric wire connecting part according to claim 5, wherein said foamed sheet which is rectangular is disposed, with said foamed sheet inclined with respect to an axial direction of said connecting part of said cores;

said adhesive tape and said foamed sheet are folded at a position where said electric wires are disposed; and portions of said foamed sheet are overlapped on each other; and portions of said adhesive tape are laminated on each other at both sides of said foamed sheet; and an overlapped side is further folded and wound.

* * * * *